United States Patent
Bae et al.

(10) Patent No.: US 10,142,345 B2
(45) Date of Patent: Nov. 27, 2018

(54) METHOD AND APPARATUS FOR MULTI-USERS REGISTERING HOME NETWORK SUPPORTING APPLICATION BASED DEVICE

(71) Applicant: Samsung Electronics Co., Ltd., Gyeonggi-do (KR)

(72) Inventors: Eun-Hui Bae, Seoul (KR); Se-Hoon Kim, Seoul (KR); Yun-Ho Park, Gyeonggi-do (KR); Jeong-Il Seo, Seoul (KR)

(73) Assignee: Samsung Electronics Co., Ltd (KR)

( * ) Notice: Subject to any disclaimer, the term of this patent is extended or adjusted under 35 U.S.C. 154(b) by 138 days.

(21) Appl. No.: 15/032,964

(22) PCT Filed: Oct. 28, 2014

(86) PCT No.: PCT/KR2014/010185
§ 371 (c)(1),
(2) Date: Apr. 28, 2016

(87) PCT Pub. No.: WO2015/065013
PCT Pub. Date: May 7, 2015

(65) Prior Publication Data
US 2016/0261600 A1    Sep. 8, 2016

(30) Foreign Application Priority Data
Oct. 28, 2013    (KR) ........................ 10-2013-0128719

(51) Int. Cl.
*H04L 29/00*    (2006.01)
*H04L 29/06*    (2006.01)
(Continued)

(52) U.S. Cl.
CPC .......... *H04L 63/101* (2013.01); *H04L 9/3226* (2013.01); *H04L 12/2803* (2013.01);
(Continued)

(58) Field of Classification Search
CPC .. H04L 63/101; H04L 9/3226; H04L 12/2803
(Continued)

(56) References Cited

U.S. PATENT DOCUMENTS

| 5,999,812 | A | * | 12/1999 | Himsworth | ........... H04W 12/06 455/411 |
| 6,869,651 | B2 | * | 3/2005 | Pan | ......................... B05D 1/18 427/407.1 |

(Continued)

FOREIGN PATENT DOCUMENTS

| WO | WO 2011132928 | 10/2011 |
| WO | WO 2012099370 | 7/2012 |

(Continued)

OTHER PUBLICATIONS

PCT/ISA/210 Search Report dated PCT/KR2014/010185 (pp. 3).

*Primary Examiner* — Anthony D Brown
*Assistant Examiner* — Michael D Anderson
(74) *Attorney, Agent, or Firm* — The Farrell Law Firm, P.C.

(57) ABSTRACT

Provide is a device and a method for registering the device supporting home networking, by a server. The method includes receiving a registration request for the device from a user and determining whether the device was registered by the user. If the device has been registered, a re-registration authentication code is obtained based on an initial authentication code of the device, and registration of the device is mapped to the re-registration authentication code.

20 Claims, 10 Drawing Sheets

(51) Int. Cl.
*H04L 9/32* (2006.01)
*H04L 12/28* (2006.01)
*H04L 12/24* (2006.01)
*H04W 12/06* (2009.01)

(52) U.S. Cl.
CPC ...... *H04L 12/2809* (2013.01); *H04L 12/2818* (2013.01); *H04L 41/12* (2013.01); *H04L 63/08* (2013.01); *H04W 12/06* (2013.01)

(58) Field of Classification Search
USPC .......................................................... 726/7
See application file for complete search history.

(56) References Cited

U.S. PATENT DOCUMENTS

2008/0288657 A1    11/2008   Ushiyama
2009/0198998 A1     8/2009   Kim et al.
2013/0325939 A1    12/2013   Shim et al.

FOREIGN PATENT DOCUMENTS

WO    WO 2012141494    10/2012
WO    WO 2013070017     5/2013

\* cited by examiner

METHOD AND APPARATUS FOR MULTI-USERS REGISTERING HOME NETWORK SUPPORTING APPLICATION BASED DEVICE

PRIORITY

This application is a National Phase Entry of PCT International Application No. PCT/KR2014/010185, which was filed on Oct. 28, 2014, and claims priority to Korean Patent Application No. 10-2013-0128719, which was filed on Oct. 28, 2013, the contents of each of which are incorporated herein by reference.

BACKGROUND

1. Field of the Invention

The present invention relates to a method and an apparatus which allow multiple users to register an application-based device that supports a home networking.

2. Description of the Related Art

According to the evolution of a wireless communication system, a smart function has been added to not only mobile phones but also household electrical devices. Accordingly, it is possible to implement home networking that enables household electrical devices, which are installed in a house for family use or a building, to be connected to each other on the basis of an internal network and further, enables the household electrical devices to be controlled through an external network. Examples of the household electrical devices, to which this home networking can be applied, may include a lighting device, an energy apparatus, an electrical apparatus, a security apparatus, a gas apparatus, and the like which are installed in a house or a building.

Meanwhile, the above-described home networking may also be performed through an application of a smart phone, of which development is recently being activated. However, an application which supports the above-described home networking has a problem of weak security in that a user can optionally use a household electrical device, that the relevant user does not have a right to register, through the application regardless of whether the relevant user who has installed the application has a right to register a relevant household electrical device. Therefore, there is a situation where the user's security method is more specifically required for the application which supports a home networking function.

DETAILED DESCRIPTION OF THE INVENTION

Technical Problem

The present invention is related to a method and an apparatus for registering an application-based device that supports home networking so as to enable only users, who have a right to register devices that perform home networking, to use a relevant device.

Technical Solution

In accordance with an aspect of the present invention, a method for registering a device supporting home networking, by a server is provided. The method includes receiving a registration request for a device from a user; determining whether the device has registered by the user; if the device has registered, obtaining a re-registration authentication code based on an initial authentication code of the device; and registering the device mapped to the re-registration authentication code.

In accordance with another aspect of the present invention, a method for registering a device supporting home networking, by a control apparatus is provided. The method includes transmitting, to a sever, registration request for a device from a user; if the device has registered, obtaining a re-registration authentication code based on an initial authentication code of the device; and receiving, from the server, a notification of the registration of the device mapped to the re-registration authentication code.

In accordance with still another aspect of the present invention, a server for registering a device that supports home networking is provided. The server includes a transceiver configured to receive a registration request for a device from a user, and a controller configured to determine whether the device has registered by the user, if the device has registered, obtain a re-registration authentication code based on an initial authentication code of the device, and register the device mapped to the re-registration authentication code.

In accordance with yet another aspect of the present invention, a control apparatus for registering a device that supports home networking is provided. The control apparatus includes a transmitter configured to transmit, to a sever, registration request for a device from a user, if the device has registered, the controller configured to obtain a re-registration authentication code based on an initial authentication code of the device; and a receiver configured to receive from the server, a notification of the registration of the device mapped to the re-registration authentication code.

Advantageous Effects

The present invention configures a registration procedure for a home network target device as an initial registration procedure and a re-registration procedure in order to strengthen security in the registration procedure for the home network target device, acquires an authentication code for the re-registration procedure for the relevant device in process of the initial registration procedure, causes the device, of which re-registration is desired to be performed, to use an authentication code generated in process of the initial registration procedure, and thereby can limit access by users who do not have their rights.

DETAILED DESCRIPTION OF EMBODIMENTS OF THE PRESENT INVENTION

Figure 1:
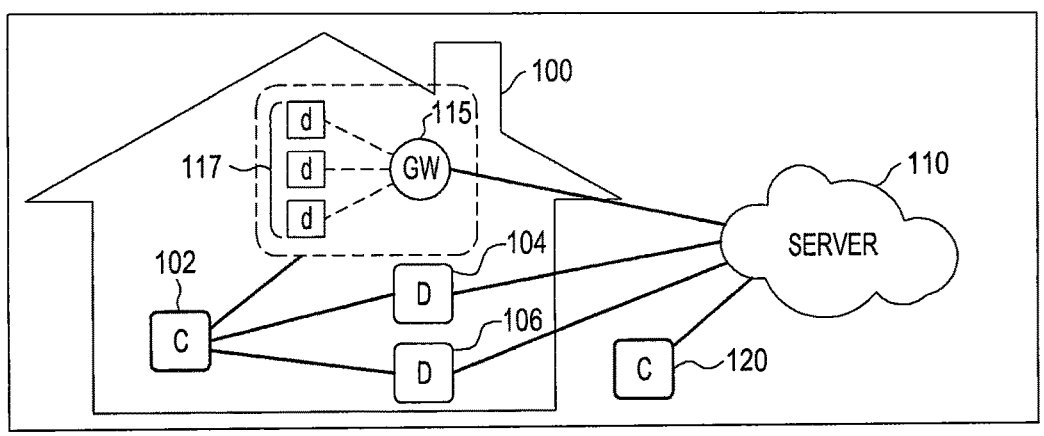
FIG. 1 is a view illustrating a configuration which supports typical home networking.

Hereinafter, the operating principle of exemplary embodiments of the present invention will be described in detail with reference to the accompanying drawings. Like reference numerals designate like components in the drawings where possible even though components are shown in different drawings. In the following description of the present invention, a detailed description of related known functions or configurations will be omitted so as not to obscure the subject of the present invention. The terms which will be described below are terms defined in consideration of the functions in the present invention, and may be different according to users, intentions of the users, or customs. Therefore, the definition should be made based on the overall contents of the present specification.

FIG. 1 is a view illustrating an example of a configuration which supports typical home networking.

Referring to FIG. 1, in an example of a house for family use, a building, or the like in which the above-described home networking is implemented, a house 100, devices 104 and 106 installed in the house 100, and a control apparatus 102 are included. For convenience of description, in FIG. 1, the devices are represented as 'D's' and the control apparatus is represented as 'C.' Consideration is given to a state in which the control apparatus 102 installs an application which supports home networking. In this regard, the control apparatus 102 receives a user input for home networking on the basis of an application installed in elements thereof and manages the devices 104 and 106 that are installed in the house 100 and correspond to the respective user inputs. Then, the control apparatus 102 performs home networking by using operations, such as the control and monitoring of the devices 104 and 106, and the like, and then provides a service interface that notifies a user of a result of performing the home networking. The control apparatus 102 corresponds to a smart phone, a tablet Personal Computer (PC), and the like, in each of which an application supporting the home networking is capable of being installed.

Each of the devices 104 and 106 is a device including a communication module that supports a home network function controlled by the control apparatus 102, and examples of the devices 104 and 106 may include a lighting device, an energy device, an electrical device, a security device, a gas device, and the like. Also, in order to interact with the user, each of the devices 104 and 106 may have pieces of SoftWare (SW), which are capable of working in cooperation with the application, installed therein, and may further include a display apparatus and the like for direct communication with the user.

Lastly, the server 110 may provide an application which supports the home networking, and may be connected not only to the control apparatus 102 in which the application is installed and is located inside the house 100, but also to a control apparatus 120 that is located outside the house 100. Also, the server 110 supports functions for home networking with the devices 104 and 106, which are installed in the house 100, through the control apparatuses. The functions for home networking include the user authentication of the application, the service authentication thereof, the registration of a device that is desired to be used for home networking, and the like. The above-described functions will be described below in detail with reference to FIG. 2.

Meanwhile, a GateWay (GW) 115 provides the access of not only devices 117, that do not support a home network function but support wireless communication, but also the devices 104 and 106 to a wireless network (which is not illustrated in the drawings, and corresponds to, for example, a wi-Fi Access Point (AP)) and the like) which are not illustrated in the drawings.

Figure 2:
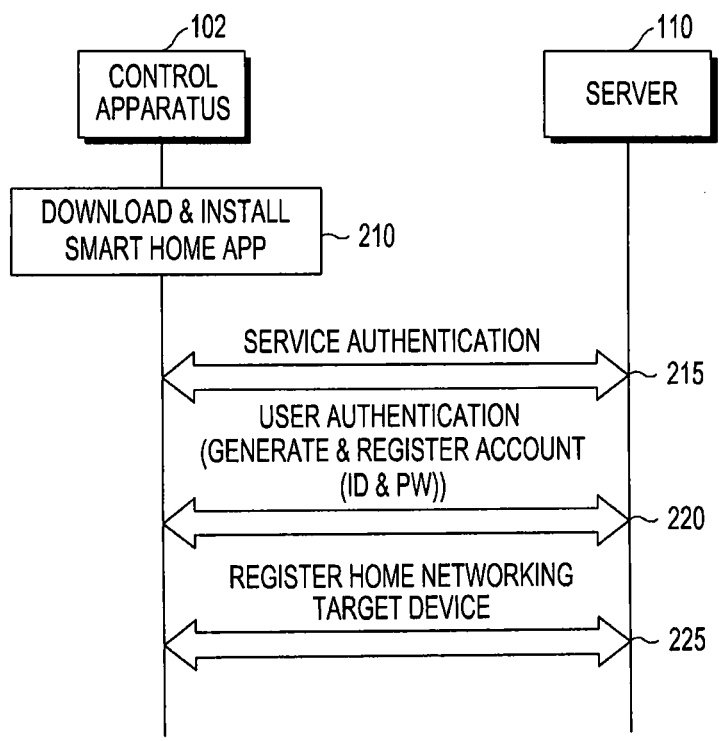
FIG. 2 is a view explaining an operation procedure of registering a device desired to be used for home networking through an application which supports typical home networking.

FIG. 2 is a view explaining an example of an operation procedure of registering a device desired to be used for home networking through an application which supports typical home networking. For convenience of description, a name of the application which supports home networking will be defined as "smart home app." Also, consideration is given to a case in which the server 110 illustrated in FIG. 1 provides the smart home app. Further, registration procedures illustrated in FIG. 2 are performed by the control apparatus 102, that is installed in the house 100 illustrated in FIG. 1, as an example, and consideration is given to a case in which the control apparatus 102 is a smart phone including a display apparatus, as an example.

Referring to FIG. 2, in step 210, as an example, the control apparatus 102 downloads and installs the application (i.e., "smart home app"), which supports home networking, in order to access an app store and the like and perform the home networking with the devices installed in the house 100. When the downloading and installation of the smart home app have been completed, in step 215, the control apparatus 102 performs the service authentication of the server 110 and the smart home app. In the service authentication procedure, the smart home app, which is downloaded by the control apparatus 102 attempting to access the server 110, is an application that a service operator normally distributes through an app store and the like, and the service authentication procedure includes a process of confirming that the smart home app is currently in a valid state. When the service authentication procedure has been normally completed, in step 220, the control apparatus 102 together with the server 110 perform the user authentication of the smart home app. Specifically, in the user authentication procedure, the control apparatus 102 registers, in the server 110, an account (i.e., an IDentification (ID) and a PassWord (PW)) to be used in the smart home app. Then, in the user authentication procedure, when the server 110 notifies the control apparatus 102 of the completion of the registration of the account, the control apparatus 102 accesses the server 110 by using the registered account.

Next, in step 225, the control apparatus 102 selects a device, that is to perform home networking, from among the devices within the house 100 on the basis of the smart home app. Then, the control apparatus 102 performs a procedure for registering, in the server 110, the selected device as a target device to be used based on the smart home app. At this time, the server 110 performs a separate authentication procedure according to a registration request of the control apparatus 102, and registers the relevant device in a Data-Base (DB) thereof.

At this time, although not illustrated in FIG. 1, consideration is given to a state in which the control apparatus 120 located outside the house 100 illustrated in FIG. 1 is connected to a wireless network installed inside the house 100. In this case, in the state where the control apparatus 120 is accessing the wireless network, the devices 104 and 106 that are accessing the wireless network may also be found. Accordingly, the control apparatus 120 may download the smart home app, may perform the operations described with reference to FIG. 2 on the basis of the downloaded smart home app, and may register the devices 104 and 106 in the server 110. In this case, a situation may occur in which the devices 104 and 106 installed in the house 100 perform an operation for home networking according to the control of an external user.

Actually, due to the characteristics of home networking, in order to enable various users, such as family members of the house 100, to perform home networking on the devices within the house 100, the various users may make requests for registering home network target devices at various locations. Accordingly, the following embodiments of the present invention propose a method which enables only users who have their respective registration rights to register a home network target device in order to strengthen the security of home networking. Specifically, embodiments of the present invention require the relevant server to perform a re-registration procedure for actual use on devices for which a registration procedure for a home network target device has been completed. Also, embodiments of the present invention propose a method for giving only users, who have completed the required re-registration procedure, a right which enables the users to perform home networking on the relevant device. Specifically, in embodiments of the present invention, the registration procedure for a home network target device is largely configured as an initial registration procedure and a re-registration procedure. The initial registration procedure, according to embodiments of the present invention, includes verifying an initial authentication code of a relevant device, and issuing a re-registration authentication code to be used in the re-registration procedure. Here, according to embodiments of the present invention, with respect to the re-registration authentication code, a case where a main issuance agent is a server and a case where the main issuance agent is based on a user input are included.

The re-registration procedure, according to embodiments of the present invention, includes a process for acquiring a re-registration authentication code; a procedure for verifying the acquired re-registration authentication code; and a procedure for updating a re-registration authentication code. Also, according to embodiments of the present invention, the procedure for updating the re-registration authentication code also includes a case where a main issuance agent is a server and a case where the main issuance agent is based on a user input.

Hereinafter, according to a first embodiment of the present invention, in a registration procedure for a home network target device, after an initial registration procedure is performed together with a server on an optional device, a re-registration authentication code generated for the optional device is acquired from the server, and is delivered to the optional device. Hereinafter, an initial registration authentication code in this specification may be provided through a card and the like that an operator provides when a device is initially purchased, or may be provided by using a Quick Response (QR) code/a Near Field Communication (NFC) and Bluetooth code, and the like on a sticker and the like which are attached within a device.

Hereinafter, for convenience of description, configurations of devices, according to embodiments of the present invention, will be described with reference to the configurations illustrated in FIG. 1. Also, according to embodiments of the present invention, space within the house 100 may be divided, and each of the divided spaces may be configured to include devices and a control apparatus that are installed in each of the divided spaces. Here, examples of the divided spaces may include a kitchen, a living room, a bathroom, a bedroom, and the like. Accordingly, based on an application which supports home networking, the control apparatus 102 may manage the devices installed in the house 100, or may manage the devices installed in each of the divided spaces within the house 100. Alternatively, according to another embodiment of the present invention, devices may be managed in the form of a particular group that the user defines for each use. Examples of the use of the particular group may include use in a movie mode, the use of a party, the use of refreshing, the use of a meal, the use of sleeping, and the like. Accordingly, according to embodiments of the present invention, registration and re-registration procedures may be performed on a device, for which registration and re-registration procedures are performed, together with other devices having the use or purpose of home networking which is identical to the use or purpose of home networking defined by the user. As a specific example, consideration is given to a case in which the user intends to perform home networking in a living room. In this regard, according to embodiments of the present invention, the user may perform, together, registration and re-registration procedures on, for example, a television (TV), an air conditioner, lighting, and the like which are installed in the living room.

Figure 3:
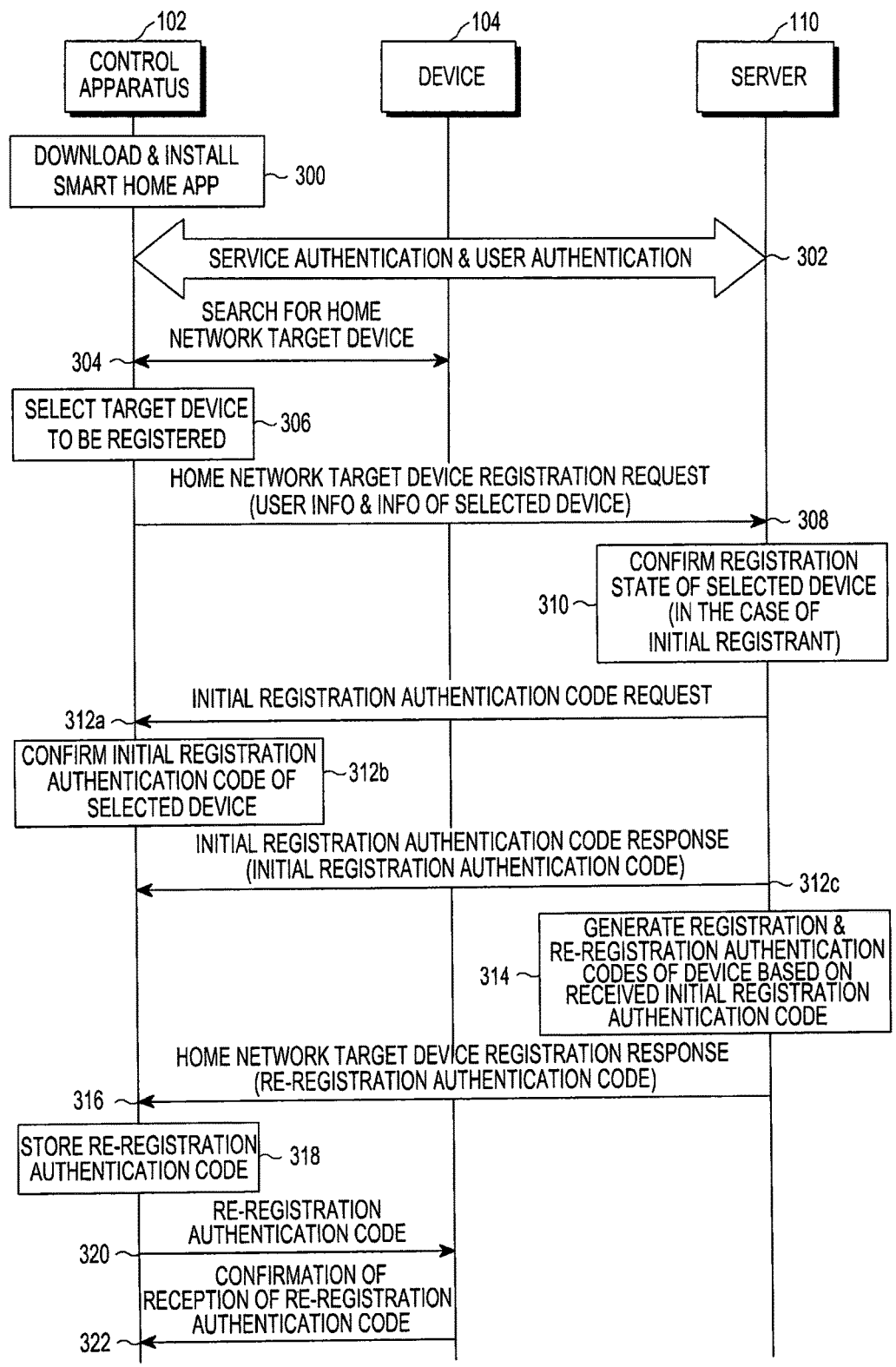
FIG. 3 is a flow diagram illustrating an example of an initial registration procedure for a home network target device according to a first embodiment of the present invention.

FIG. 3 is a flow diagram illustrating an example of an initial registration procedure for a home network target device according to the first embodiment of the present invention. Referring to FIG. 3, in step 300, in order to perform home networking on the devices installed in the house 100, the control apparatus 102 downloads and installs the application (i.e., the smart home app), and performs a service authentication and a user authentication in step 302. Here, the service authentication and the user authentication are performed as described in steps 215 and 220 illustrated in FIG. 2, and thus, the repetitive description will be omitted herein.

In step 304, according to a first embodiment, of the present invention, the control apparatus 102 searches for a home network target device, that is to be registered for home networking, among devices that are installed in the house 100, devices that are installed in each of the divided spaces within the house 100, or devices that are grouped for each use, on the basis of the smart home app. Next, in step 306, the control apparatus 102 selects a target device to be registered from among the found devices. Here, as an example, consideration is given to a case in which the selected device is the device 104 located in the living room of the house 100 illustrated in FIG. 1. Then, in step 308, the control apparatus 102 transmits a home network target device registration request to the server 110 of FIG. 1 which is an example of a server supporting the smart home app. At this time, the home network target device registration request includes user information, which includes device information of the control apparatus 102, and information of the device 104 selected in step 306.

Thereafter, in step 310, the server 110, that has received the home network target device registration request, confirms whether the device 104 is registered, on the basis of the information of the selected device 104. When it is confirmed that the device 104 has never been registered, the server 110 recognizes that the control apparatus 102 is an initial registrant with respect to the device 104. Next, in step 312*a*, the server 110 transmits an initial registration authentication code request to the control apparatus 102. Accordingly, in step 312*b*, the control apparatus 102 confirms an initial registration authentication code of the device 104 by using a card acquired when the selected device 104 has been purchased, or a QR code/NFC attached to the outside of the device 104. Next, in step 312*c*, the control apparatus 102 delivers the confirmed initial registration authentication code to the server 110 in response to the initial registration authentication code request.

Then, in step 314, when the server 110 confirms the reception of the initial registration authentication code of the device, the server 110 generates a re-registration authentication code of the device 104, and registers the device 104. Accordingly, in a DB of the server, the server 110 maps the initial registration authentication code and the re-registration authentication code to information of the registrated device 104 and stores the initial registration authentication code and the re-registration authentication code, which are mapped to the information of the registrated device 104. At this time, in order to cause the server 110 and the control apparatus 102 to verify the re-registration authentication code, the re-registration authentication code may be generated by using a scheme identical to a scheme for generating an initial registration authentication code by the server 110.

Thereafter, in step 316, the server 110 delivers, to the control apparatus 102, a response to the home network target device registration request in step 308 in a state of including the re-registration authentication code. In step 318, the control apparatus 102, that has received the response, maps the re-registration authentication code to the information of the device 104 and stores the re-registration authentication code mapped to the information of the device 104. Next, in step 320, the control apparatus 102 delivers the re-registration authentication code to the device 104. Then, in step 322, the control apparatus 102 receives, from the device 104, the confirmation of the reception of the re-registration authentication code.

Hereinafter, according to a second embodiment of the present invention, in a registration procedure for a home network target device, after an initial registration procedure is performed together with a server on an optional device, a re-registration authentication code setting request generated for the optional device is received from the server, and accordingly, a control apparatus, that has requested the registration procedure for the home network target device, generates a re-registration authentication code of the optional device. Then, the control apparatus delivers the re-registration authentication code; which has been generated by the control apparatus itself, to the server and the optional device, and thereby completes the registration procedure for the home network target device.

Figure 4:
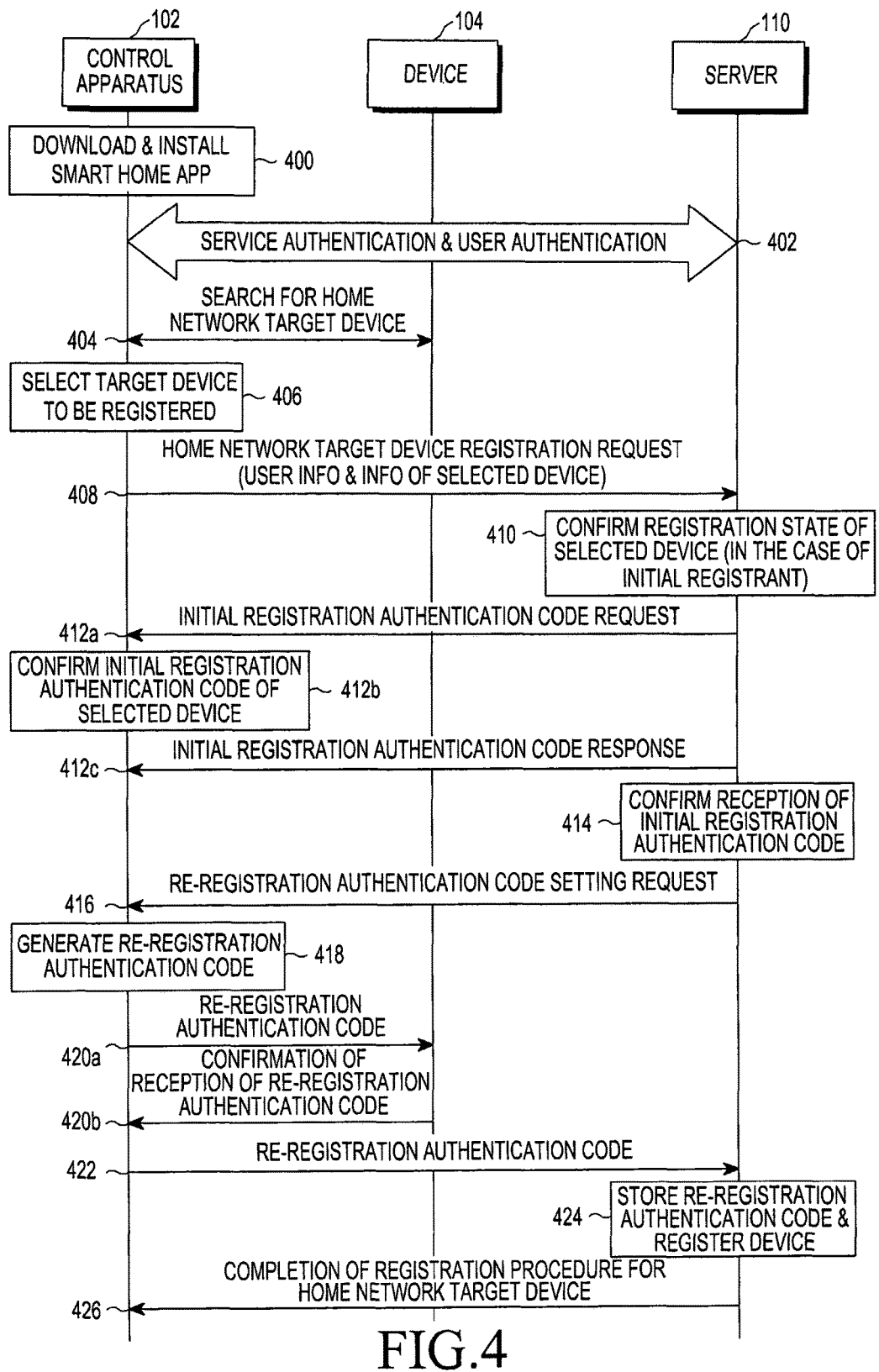
FIG. 4 is a flow diagram illustrating an example of an initial registration procedure for a home network target device according to a second embodiment of the present invention.

FIG. 4 is a flow diagram illustrating an example of an initial registration procedure for a home network target device according to the second embodiment of the present invention. Referring to FIG. 4, in step 400, in order to perform home networking on the devices installed in the house 100, the control apparatus 102 downloads and installs the application (i.e., the smart home app), and performs a service authentication and a user authentication in step 402. Here, the service authentication and the user authentication are performed as described in steps 215 and 220 illustrated in FIG. 2, and thus, the repetitive description will be omitted herein. Similarly, operations in step 404 to step 412*c* are performed as described in the operations in step 304 to step 312*c* illustrated in FIG. 3, and thus, the repetitive description will be omitted herein.

Thereafter, when the server 110 confirms the reception of the initial registration authentication code of the device 104 in step 414, in step 416, the server 110 delivers a re-registration authentication code generation request for the device 104 to the control apparatus 102. According to the second embodiment of the present invention, in step 418, the control apparatus 102, that has received the re-registration authentication code generation request, generates a re-registration authentication code of the device 104. At this time, in order to cause the server 110 and the control apparatus 102 to verify the re-registration authentication code, the control apparatus 102 may generate the re-registration authentication code by using a scheme identical to a scheme for generating an initial registration authentication code by the server 110.

Next, in step 420*a*, the control apparatus 102 delivers the generated re-registration authentication code to the device 104. Then, in step 420*b*, the control apparatus 102 receives the confirmation of the reception of the re-registration authentication code from the device 104. Next, in step 422, the control apparatus 102 also delivers the re-registration authentication code of the device 104 to the server 110. Then, in step 424, the server 110 registers the device 104; and maps the re-registration authentication code and the initial registration authentication code acquired in step 414 to the information of the device 104, and stores the re-registration authentication code and the initial registration authentication code mapped to the information of the device 104, in a DB of the server 110. Next, in step 426, the server 110 notifies the control apparatus 102 of the completion of the registration procedure according to the home network target device registration request in step 408.

Hereinafter, in a third embodiment of the present invention, when a target device, for which a home network target device registration request is made, is already registered in a server, a re-registration procedure of a registration procedure for a home network target device is entered; and the server sends a request for a re-registration authentication code of the target device to a control apparatus, receives the re-registration authentication code of the target device, and completes the registration procedure for the home network target device.

Figure 5:
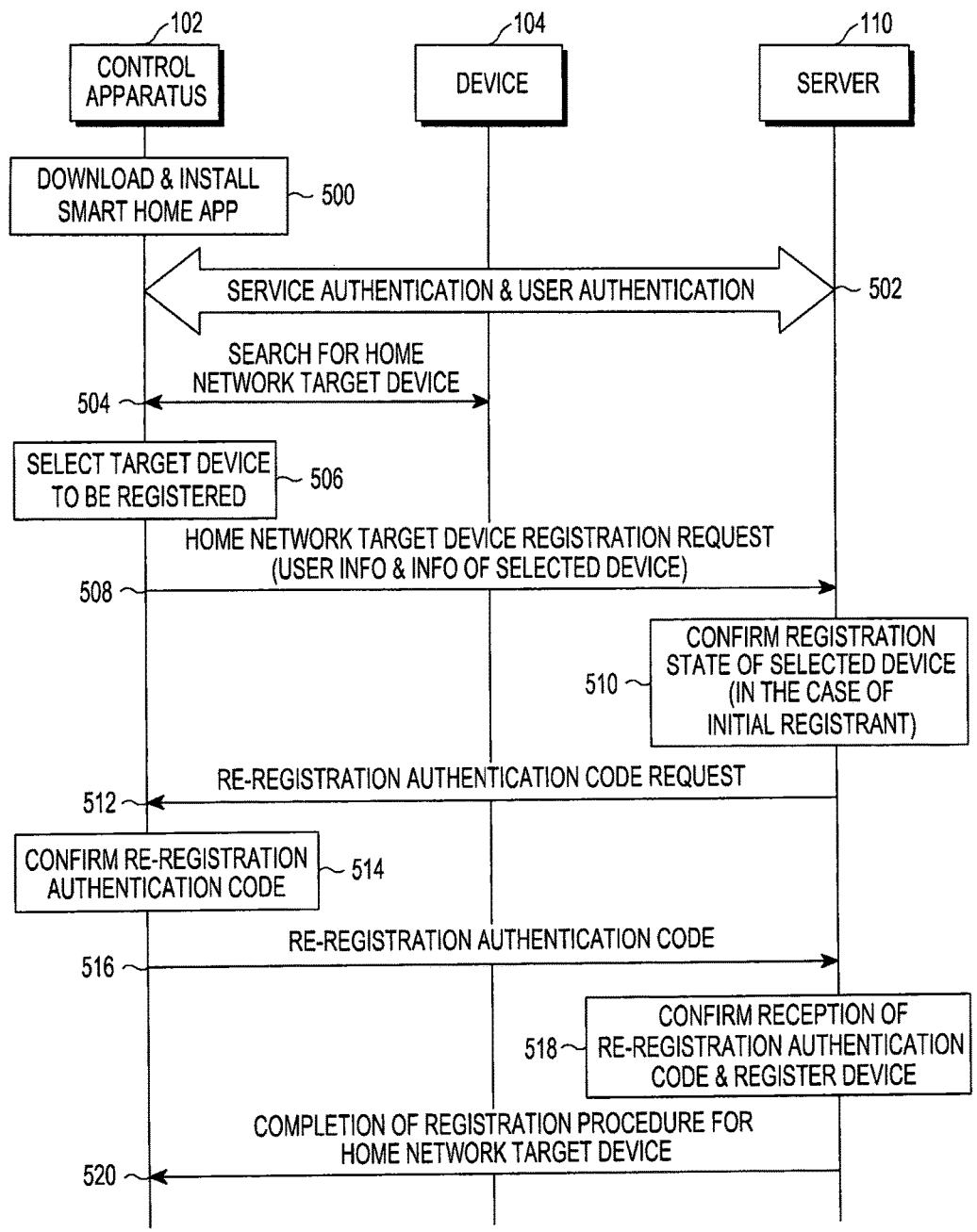
FIG. 5 is a view illustrating an example of a re-registration procedure for a home network target device according to a third embodiment of the present invention.

FIG. 5 is a view illustrating an example of a re-registration procedure for a home network target device according to the third embodiment of the present invention. Referring to FIG. 5, step 500 to step 508 are performed as described above in step 300 to step 308 illustrated in FIG. 3, and thus, the repetitive description will be omitted.

Thereafter, in step 510, the server 110 confirms a registration state of the device 104 on the basis of the information of the device 104 which has been acquired from the home network target device registration request in step 508. When it is confirmed that the device 104 is in a state of being already registered, the server 110 recognizes that the control apparatus 102 is a re-registrant with respect to the device 104. Next, in step 512, the server 110 delivers a re-registration authentication code request for the device 104 to the control apparatus 102. In step 514, the control apparatus 102 confirms a re-registration authentication code of the device 104. At this time, the control apparatus 102 may send a request for the re-registration authentication code to an initial registrant of the device 104, and may acquire the re-registration authentication code. In this case, in a process for acquiring the re-registration authentication code, the re-registration authentication code may be acquired by using an authentication code (e.g., a QR code, NFC, or the like) between the control apparatus 102 and the initial registrant. The process for acquiring the re-registration authentication code may be performed through inter-terminal direct communication (Device-to-Device (D2D) communication) which is based on security. This configuration is not directly related to the present invention, and thus, a detailed description thereof will be omitted herein. Also, the re-registration authentication code of the device 104, that the initial registrant is storing, may be acquired from the server 110 through the procedure of step 314 to step 318 illustrated in FIG. 3 as in the above-described first embodiment of the present invention, or may be directly written by the initial registrant according to the request of the server 110 through the procedure of step 416 to step 418 illustrated in FIG. 4 as in the above-described second embodiment of the present invention. Next, in step 516, the control apparatus 102 delivers, to the server 110, the re-registration authentication code of the device 104 which is acquired according to one of the embodiments of the present invention. Then, in step 518, when the server 110 receives the re-registration authentication code of the device 104, the server 110 confirms whether the received re-registration authentication code coincides with a re-registration authentication code which is being stored in the DB of the server 110 in a state of being mapped to the information of the device 104. When it is confirmed that the received re-registration authentication code coincides with the stored re-registration authentication code, the server 110 registers the device 104 as a home network target device of the control apparatus 102. Next, in step 520, the server 110 notifies the control apparatus 102 of the completion of the home network target device registration request in step 508.

According to a fourth embodiment of the present invention, when a target device, for which a home network target device registration request is made, is already registered in a server, a re-registration procedure of a registration procedure for a home network target device is entered, and the server sends, to a control apparatus, a request for a re-registration authentication code. Then, according to the fourth embodiment of the present invention, after the control apparatus sends, to the target device, a request for the re-registration authentication code, the control apparatus acquires the re-registration authentication code in response to the request, and delivers the acquired re-registration authentication code to the server; and thereby registers the device in the server, and then completes the registration procedure for the home network target device.

Figure 6:
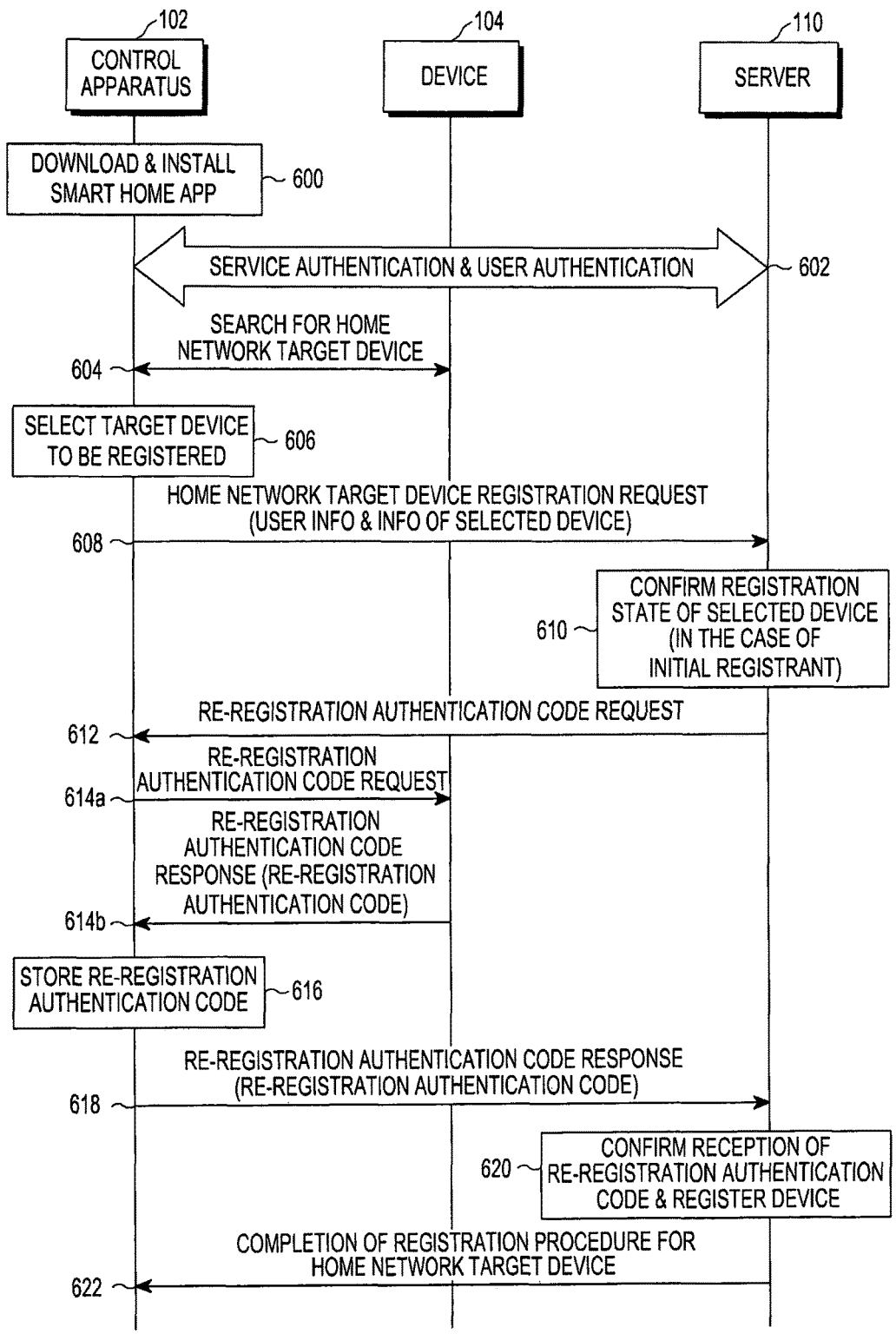
FIG. 6 is a view illustrating an example of a re-registration procedure for a home network target device according to a fourth embodiment of the present invention.

FIG. 6 is a view illustrating an example of a re-registration procedure for a home network target device according to the fourth embodiment of the present invention. Referring to FIG. 6, step 602 to step 612 are performed as described above in step 500 to step 512 illustrated in FIG. 5, and thus, the repetitive description will be omitted.

When the control apparatus 102, that the server 110 has confirmed as a re-registrant of the home network target device registration request for the device 104, receives a re-registration authentication code request from the server 110 in step 612, the control apparatus 102 proceeds to step 614a. In step 614a, the control apparatus 102 transmits the re-registration authentication code request to the device 104. At this time, the control apparatus 102 acquires, from an initial registrant, authentication information for the re-registration authentication code request for the device 104, and includes the acquired authentication information in the re-registration authentication code request. At this time, the authentication information may be acquired by using a QR code, NFC, and the like. A D2D security solution may be applied to the exchange process, and thereby, the exchange process can be securely protected. This configuration is not directly related to the present invention, and thus, a detailed description thereof will be omitted herein. Then, the device 104 confirms whether the authentication information included in the re-registration authentication code request is accurate. Next, when it is confirmed that the authentication information is accurate, in step 614b, the device 104 delivers, to the control apparatus 102, a re-registration authentication code, that the device 104 is storing, in response to the re-registration authentication code request. Then, in step 616, the control apparatus 102 maps the re-registration authentication code to the information of the device 104, and stores the re-registration authentication code mapped to the information of the device 104. Next, in step 618, the control apparatus 102 delivers, to the server 110, the re-registration authentication code of the device 104 in response to the re-registration authentication code request in step 612. When the server 110 receives the re-registration authentication code, in step 620, the server 110 confirms whether the received re-registration authentication code coincides with a re-registration authentication code which is being stored in the DB of the server 110 in a state of being mapped to the information of the device 104. When it is confirmed that the received re-registration authentication code coincides with the stored re-registration authentication code, the server 110 registers the device 104 as a home network target device of the control apparatus 102. Then, in step 622, the server 110 notifies the control apparatus 102 of the completion of the home network target device registration request in step 608.

In embodiments of the present invention, when a target device, for which a home network target device registration request is made, is already registered in a server, a re-registration procedure of a registration procedure for a home network target device is entered. Then, in a fifth embodiment of the present invention, a control apparatus that requests the registration procedure sends, to the target device, a request for triggering a re-registration authentication code, and confirms the re-registration authentication code of the device when the control apparatus receives a response to the request. Then, after the control apparatus delivers the confirmed re-registration authentication code to the device and the server, the control apparatus performs a re-registration procedure for the device on the basis of the re-registration authentication code, and accordingly, completes the registration procedure for the home network target device.

Figure 7:
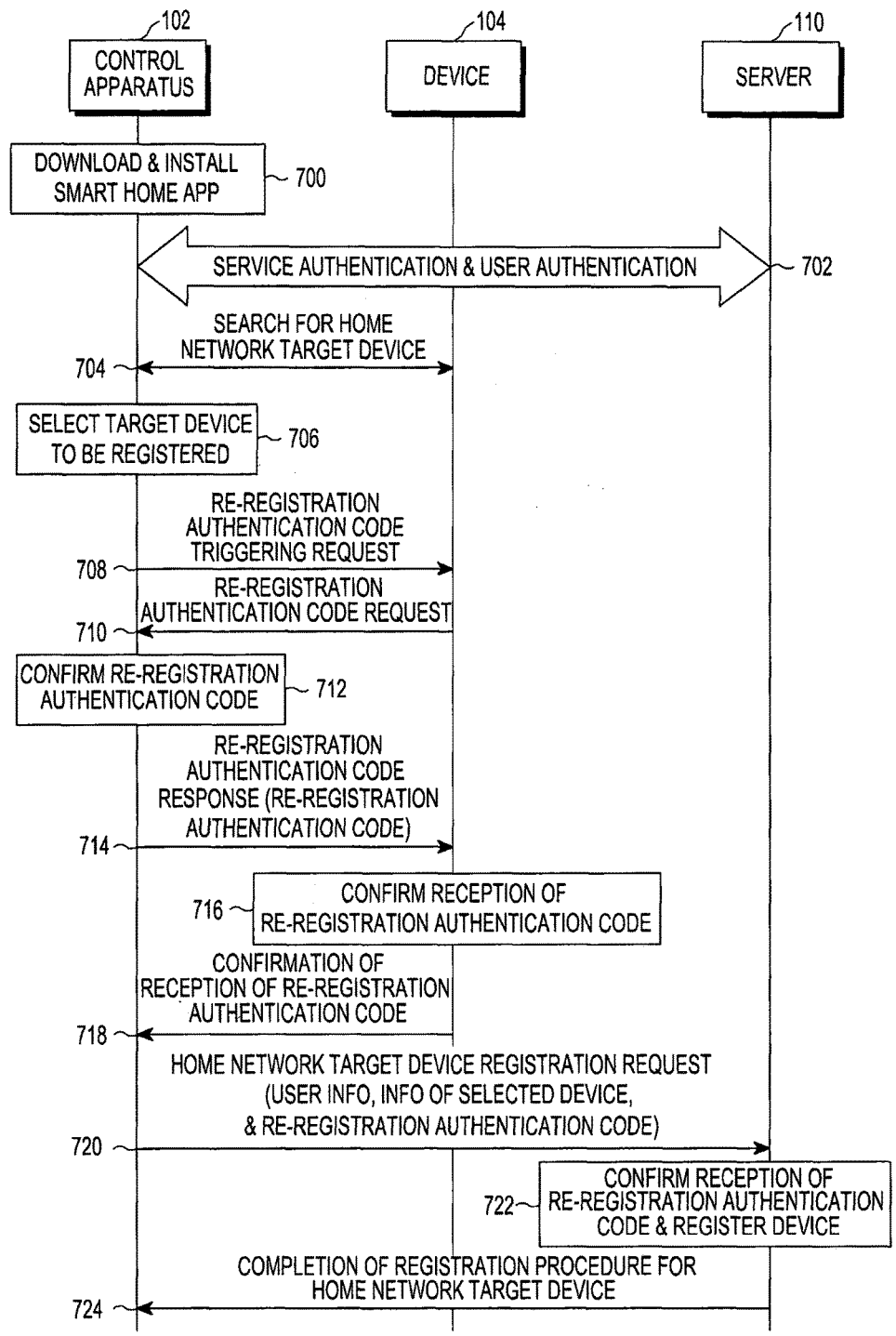
FIG. 7 is a view illustrating an example of a re-registration procedure for a home network target device according to a fifth embodiment of the present invention.

FIG. 7 is a view illustrating an example of a re-registration procedure for a home network target device according to the fifth embodiment of the present invention.

Referring to FIG. 7, step 700 to step 706 are performed as described above in step 600 to step 606 illustrated in FIG. 6, and thus, the repetitive description will be omitted. Thereafter, in step 708, the control apparatus 102 delivers a re-registration authentication code triggering request to the device 104 selected in step 706. Next, when the control apparatus 102 receives a re-registration authentication code request from the device 104 in step 710, the control apparatus 102 proceeds to step 712. In step 712, the control apparatus 102 confirms a re-registration authentication code of the device 104. At this time, the control apparatus 102 may acquire the re-registration authentication code from an initial registrant of the device 104, and a relevant operation is performed as described above in step 514 illustrated in FIG. 5, and the description thereof will be omitted. Then, in step 714, the control apparatus 102 delivers, to the device 104, the re-registration authentication code of the device 104 which has been acquired according to one of the embodiments of the present invention. The device 104, that confirms the reception of the re-registration authentication code in step 716, delivers the confirmation of the reception of the re-registration authentication code to the control apparatus 102 in step 718. Next, in step 720, the control apparatus 102 delivers the home network target device registration request to the server 110. At this time, the home network target device registration request includes user information corresponding to device information of the control apparatus 102, information of a selected device corresponding to device information of the device 104, and the re-registration authentication code mapped to the information of the selected device. Then, in step 722, the server 110, that has received the pieces of information, confirms whether the received re-registration authentication code coincides with a re-registration authentication code which is being stored in the DB of the server 110 in a state of being mapped to the information of the device 104. When it is confirmed that the received re-registration authentication code coincides with the stored re-registration authentication code, the server 110 registers the device 104 as a home network target device of the control apparatus 102. Next, in step 724, the server 110 notifies the control apparatus 102 of the completion of the home network target device registration request in step 720.

Figure 8:
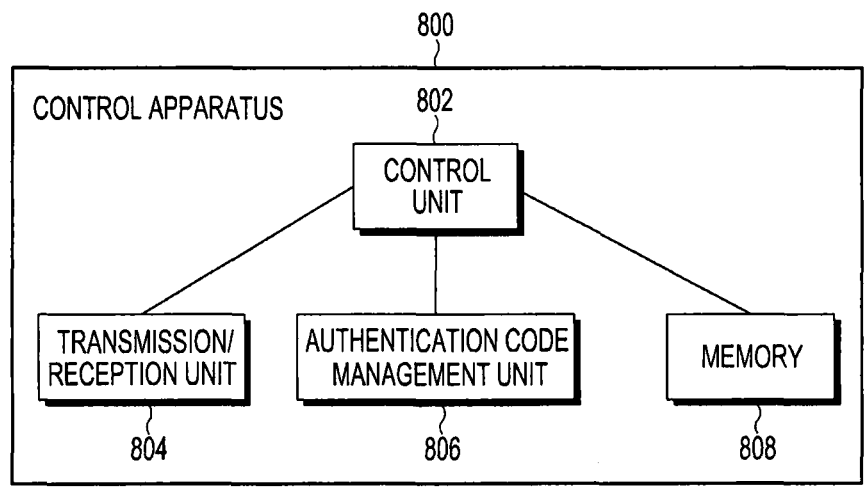
FIG. 8 is a view illustrating an example of a configuration of a control apparatus according to an embodiment of the present invention.

FIG. 8 is a view illustrating an example of a configuration of a control apparatus according to an embodiment of the present invention.

Referring to FIG. 8, the control apparatus 800 includes a control unit 802, a transmission/reception unit 804, an authentication code management unit 806, and a memory 808. The configuration of the control apparatus 800 is only disclosed as an example for convenience of description, and the respective elements of the control apparatus 800 may be integrated into one apparatus or may be divided into subunits, according to the intention of an operator or each operation of the control apparatus 800.

First, the control unit 802 completes the downloading and installation of an application, which supports home networking, through an app store and the like, and the control unit 802 together with a server supporting the application completes a service authentication and a user authentication (refer to the description of step 210 to step 220 illustrated in FIG. 2).

Also, according to embodiments of the present invention, the control unit 802 searches for home network target devices that are devices installed in the home, devices installed in areas included in the home, or devices managed in the form of a group for each use, and are capable of being managed; selects a target device to be registered; and controls the transmission/reception unit 804 to deliver a registration request for the selected device to the server (as an example, refer to the description of step 304 to step 308 illustrated in FIG. 3).

When the control apparatus 800 is an initial registrant of the registration request for the selected device, if the control unit 802 confirms that the transmission/reception unit 804 receives an initial registration authentication code request through the server, after the control unit 802 controls the authentication code management unit 806 to confirm an initial registration authentication code of the selected device according to the above-described first embodiment of the present invention, the control unit 802 maps the confirmed initial registration authentication code to the selected device, stores the confirmed initial registration authentication code mapped to the selected device in the memory 808, and controls the transmission/reception unit 804 to deliver, to the server, the confirmed initial registration authentication code mapped to the selected device. A description of a process for acquiring the initial registration authentication code is a repetition of that of step 312a-312b illustrated in FIG. 3, and thus will be omitted. Thereafter, when the control unit 802 confirms that the transmission/reception unit 804 receives, from the server, a re-registration authentication code generated after the completion of the registration of the selected device, the control unit 802 maps the re-registration authentication code to the selected device, and stores the re-registration authentication code mapped to the selected device, in the memory 808; and delivers, to the selected device, the re-registration authentication code mapped to the selected device, and confirms whether the selected device receives the re-registration authentication code mapped to the selected device. Alternatively, according to the second embodiment of the present invention, when the transmission/reception unit 804 receives a re-registration authentication code setting request from the server, the control unit 802 generates a re-registration authentication code of the selected device, and delivers the generated re-registration authentication code to the selected device and the server.

Meanwhile, when the control apparatus 800 is a re-registrant of a registration request for the selected device, the transmission/reception unit 804 receives a re-registration authentication code request from the server, and the control apparatus 800 controls the authentication code management unit 806 to confirm the re-registration authentication code, according to the above-described fourth embodiment of the present invention. Art operation of confirming the re-registration authentication code is acquired from the initial registrant, and a description thereof is a repetition of that of step 514 illustrated in FIG. 5, and thus will be omitted. Alternatively, the control unit 802 may control the authentication code management unit 806 to acquire a re-registration authentication code from the selected device as described in steps 614a and 614b according to the fourth embodiment of the present invention, and may store the acquired re-registration authentication code in the memory 808. Lastly, according to the above-described fifth embodiment of the present invention, the control unit 802 may control the transmission/reception unit 804 and the authentication code management unit 806 to operate so as to correspond to step 708 to step 712 illustrated in FIG. 7, and thereby may control the transmission/reception unit 804 and the authentication code management unit 806 to acquire the re-registration authentication code of the selected device.

Thereafter, the control apparatus 800 controls the transmission/reception unit 804 to deliver the acquired re-registration authentication code to the server.

Figure 9:
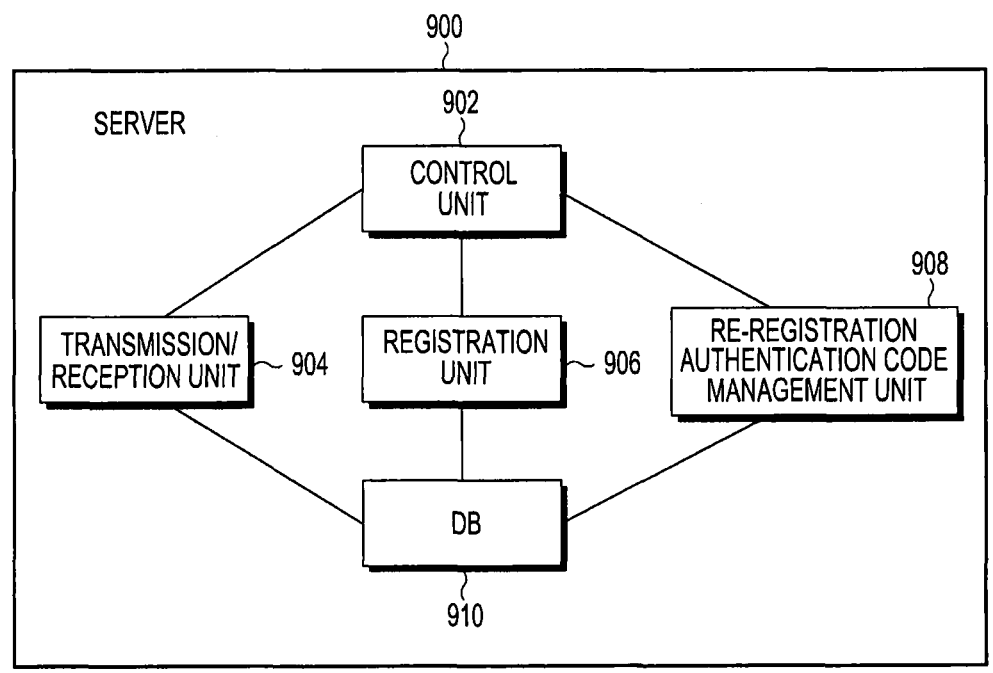
FIG. 9 is a view illustrating an example of a configuration of a server according to an embodiment of the present invention.

FIG. 9 is a view illustrating an example of a configuration of a server according to an embodiment of the present invention.

Referring to FIG. 9, the server 900 includes a control unit 902, a transmission/reception unit 904, a registration unit 906, a re-registration authentication code management unit 908, and a DB 910. Similarly, the configuration of the server 900 is also only disclosed as an example for convenience of description, and the respective elements of the server 900 may be integrated into one apparatus or may be divided into sub-units, according to the intention of an operator or each operation of the server 900.

When the control unit 902 confirms the reception of a home network target device registration request through the transmission/reception unit 904, the control unit 902 confirms whether a user is an initial registrant or a re-registrant with respect to a selected device, by using use information and information of the selected device which are acquired from the home network target device registration request. When it is confirmed that the user is the initial registrant, the control unit 902 sends, to the user, a request for an initial registration authentication code, and controls the transmission/reception unit 904 to receive a response to the request. Then, after the control unit 902 controls the registration unit 906 to perform a registration procedure for the selected device on the basis of the received initial registration authentication code, according to the first embodiment of the present invention, the control unit 902 controls the re-registration authentication code management unit 908 to generate a re-registration authentication code of the selected device, and controls the transmission/reception unit 904 to deliver the generated re-registration authentication code to the user. Alternatively, according to the second embodiment of the present invention, the control unit 902 controls the transmission/reception unit 904 to deliver a re-registration authentication code setting request to the user. Also, in the case of the second embodiment of the present invention, the control unit 902 acquires a re-registration authentication code of the selected device, that the user has generated, stores the acquired re-registration authentication code in the DB 910, and controls the registration unit 906 to perform a registration procedure on the basis of the stored re-registration authentication code.

Meanwhile, when it is confirmed that the user is the re-registrant, according to the third embodiment of the present invention, the control unit 902 controls the transmission/reception unit 904 to send, to the user, a request for a re-registration authentication code of the selected device and to receive a response to the request. A description of a process for acquiring the re-registration authentication code is a repetition of that of step 514 illustrated in FIG. 5, and thus will be omitted. Then, so as to correspond to step 518 illustrated in FIG. 5, the control unit 902 controls the re-registration authentication code management unit 908 to confirm whether the received re-registration authentication code coincides with a re-registration authentication code which is being stored in the DB 910 in a state of being mapped to the device 104. When the received re-registration authentication code coincides with the stored re-registration authentication code, the control unit 902 controls the registration unit 906 to perform a registration procedure of the selected device. Alternatively, according to the fourth embodiment of the present invention, the control unit 902 controls the transmission/reception unit 904 to deliver a re-registration authentication code request to the user, and controls the registration unit 906 to perform a registration procedure (which corresponds to step 620 of FIG. 6) by using a re-registration authentication code acquired by the operations in step 614*a* to step 616 illustrated in FIG. 6.

Figure 10:
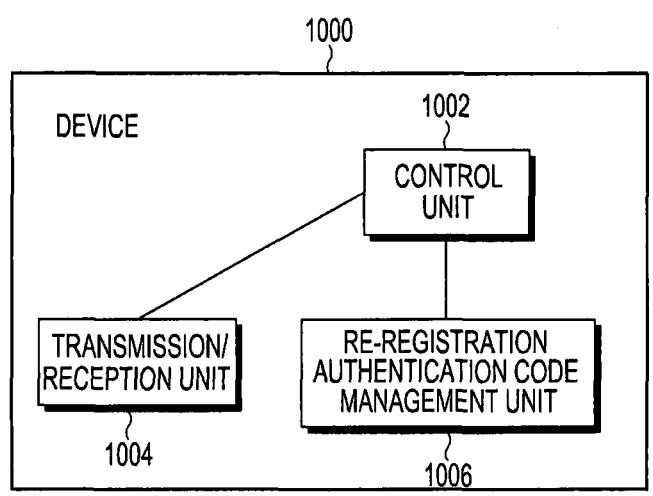
FIG. 10 is a view illustrating an example of a configuration of a device according to an embodiment of the present invention.

FIG. 10 is a view illustrating an example of a configuration of a device according to an embodiment of the present invention.

Referring to FIG. 10, the device 1000 includes a control unit 1002, a transmission/reception unit 1004, and a re-registration authentication code management unit 1006. The device is also only disclosed as an example for convenience of description, and the respective elements of the device 1000 may be integrated into one apparatus or may be divided into sub-units, according to the intention of an operator or each operation of the device 1000.

First, when the control unit 1002 of the device 1000 confirms the reception of a re-registration authentication code of the device 1000 from a user who is an initial registrant, the control unit 1002 controls the transmission/reception unit 1004 to deliver, to the user, the confirmation of the reception of the re-registration authentication code. The re-registration authentication code may be acquired by the operation in step 312*a* or 312*b* of FIG. 3, which is performed by the user, in the case of the first embodiment of the present invention, or may be directly generated by the user in step 418 of FIG. 4 in the case of the second embodiment of the present invention.

Meanwhile, when the user who performs a home network target device registration request is a re-registrant, the control unit 1002 recognizes the reception of a re-registration authentication code request through the transmission/reception unit 1004, according to the fourth embodiment of the present invention, the control unit 1002 controls the re-registration authentication code management unit 1006 to operate so as to correspond to the operations in steps 614*a* and 614*b* illustrated in FIG. 6. Alternatively, according to the fifth embodiment of the present invention, when the control unit 1002 confirms that the transmission/reception unit 1002 has received a re-registration authentication code triggering request from the user, the control unit 1002 controls the transmission/reception unit 1004 to transmit a re-registration authentication code request to the user. Then, the control unit 1002 controls the re-registration authentication code management unit 1006 and the transmission/reception unit 1004 to operate so as to correspond to the operations in step 714 to step 718 illustrated in FIG. 7.

Figure 11:
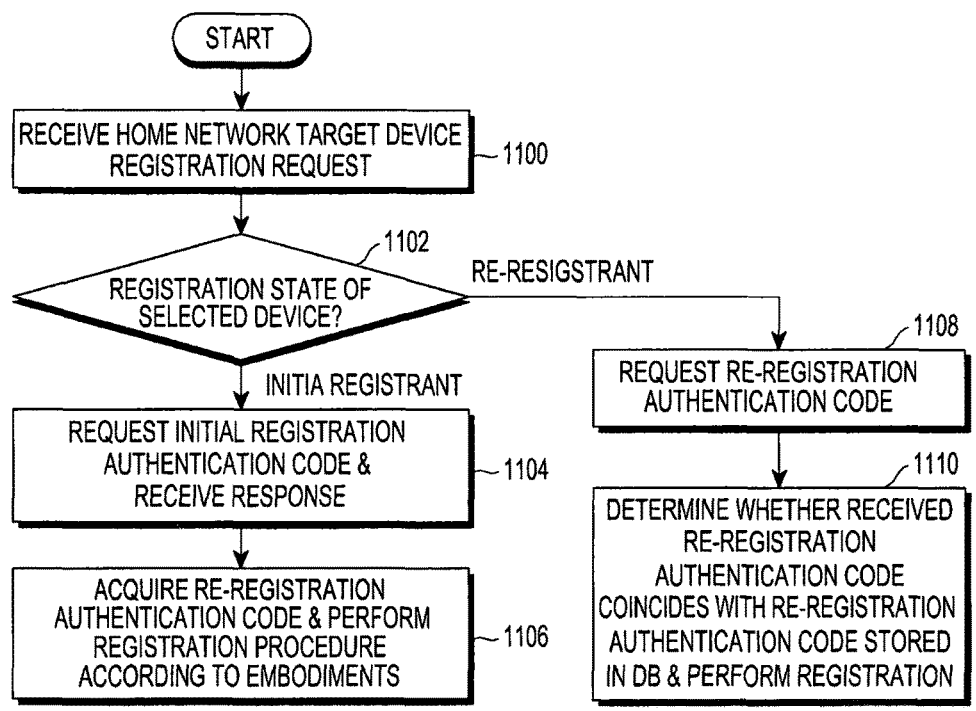
FIG. 11 is a flowchart illustrating an overall operation of a registration procedure for a home network target device, which includes an initial registration procedure and a re-registration procedure and is performed by a server, according to first to fourth embodiments of the present invention.

FIG. 11 is a flowchart illustrating an overall operation of a registration procedure for a home network target device, which includes an initial registration procedure and a re-registration procedure and is performed by a server, according to the first to fourth embodiments of the present invention.

Referring to FIG. 11, in step 1100, the server receives a home network target device registration request from the control apparatus. At this time, the home network target device registration request includes user information including device information of the control apparatus and information of a device that the control apparatus has selected as a home networking target. A description of the selection process is a repetition of that of step 306 illustrated in FIG. 3, and thus will be omitted.

Next, in step 1102, the server determines whether the DB of the server includes information, which coincides with the information of the selected device, and confirms a registration state of the selected device. When it is confirmed that the information coinciding with the information of the selected device does not exist, the server confirms that the control apparatus is an initial registrant with respect to the selected device, and proceeds to step 1104. When, in step 1104, the server sends a request for an initial registration authentication code to the control apparatus and receives a response to the request, the server proceeds to step 1106. A description of a process for requesting the initial registration authentication code and receiving the response is also a repetition of that of the operations in step 312*a* to step 312*b* illustrated in FIG. 3, and thus will be omitted. In step 1106, after the initial registration authentication code is acquired, in the case of the first embodiment of the present invention, the server registers the device on the basis of the initial registration authentication code, generates a re-registration authentication code of the selected device, and delivers the generated re-registration authentication code to the control apparatus (step 314 of FIG. 3). Alternatively, in the case of the second embodiment of the present invention, the server sends a request for setting a re-registration authentication code to the control apparatus, acquires the re-registration authentication code generated by the control apparatus, and then registers the selected device on the basis of the acquired re-registration authentication code (step 416 to step 424 of FIG. 4).

Meanwhile, when it is confirmed in step 1102 that the information coinciding with the information of the selected device exists, the server confirms that the control apparatus is a re-registrant with respect to the selected device, and proceeds to step 1108. In step 1108, the server sends a request for a re-registration authentication code of the selected device to the control apparatus. In step 1110, after the server determines whether the re-registration authentication code acquired from the control apparatus coincides with a re-registration authentication code stored in the DB, registers the selected device when the re-registration authentication code acquired from the control apparatus coincides with the re-registration authentication code stored in the DB, and completes the registration procedure for the home network target device with respect to the selected device. The operations in steps 1108 and 1110 correspond to the operations in step 512 to step 518 in the case of the third embodiment of the present invention, and correspond to the operations in step 612 to step 620 in the case of the fourth embodiment of the present invention. Accordingly, the repetitive description thereof will be omitted.

According to the above-described embodiments of the present invention, a re-registration procedure for the selected device is performed by using a re-registration authentication code acquired in an initial registration process for the selected device, and thereby, it is possible to limit access by users who do not have their rights.

Although the embodiment has been described in the detailed description of the present invention, the present invention may be modified in various forms without departing from the scope of the present invention. Thus, the scope of the present invention shall not be determined merely based on the described exemplary embodiments and rather determined based on the accompanying claims and the equivalents thereto.

The invention claimed is:

1. A method for registering a device supporting home networking, by a server, the method comprising:
   receiving, from a first device, a registration request message for a second device, wherein the registration request message includes device information of the second device;
   identifying that the second device is not registered based on the device information of the second device;
   registering the second device based on confirming a first authentication code of the second device;
   obtaining a first re-registration authentication code of the second device when the first authentication code of the second device is confirmed;
   mapping the first re-registration authentication code to the device information of the second device; and
   transmitting, to the first device, a completion message for the registration procedure for the second device.

2. The method of claim 1,
   wherein registering the second device comprises:
   transmitting, to the first device, an authentication code request message for the second device; and,
   receiving, from the first device, an authentication code response message comprising the first authentication code of the second device in response to the authentication code request message, and
   wherein obtaining the first re-registration authentication code of the second device comprises:
   generating the first re-registration authentication code when the first authentication code of the second device is confirmed,
   wherein the completion message comprises the first re-registration authentication code, and
   wherein the first re-registration authentication code is transmitted to the second device through the first device.

3. The method of claim 1, wherein obtaining the first re-registration authentication code of the second device comprises:
   obtaining, the first re-registration authentication code generated by the first device from the response message when the first authentication code of the second device is confirmed.

4. The method of claim 1, further comprising:
   identifying that the second device is registered based on the device information of the second device;
   transmitting, to the first device, a request message for a second re-registration authentication code of the second device;
   receiving, from the first device, a response message comprising the second re-registration authentication code;
   performing a re-registration procedure of the second device by comparing the first re-registration authentication code and the second re-registration authentication code; and
   if the first re-registration authentication code is same as the second re-registration authentication code, transmitting, to the first device, a completion message for the re-registration procedure.

5. The method of claim 1, further comprising:
   during registering of the second device, registering at least one different device, that is located in an identical space where the device is located among spaces into which a service coverage where the home networking is supported is divided, or at least one different device that is grouped together with the second device for each use defined by a user.

6. A method for registering a device supporting home networking, by a first device, the method comprising:
   transmitting, to a sever, a registration request message for a second device, wherein the registration request message includes device information of the second device;
   receiving, from the server, a request message for a first authentication code of the second device in response to the registration request message;
   transmitting, to the server, the first authentication code, wherein the server performs a registration procedure based on confirming the first authentication code;
   storing a first re-registration authentication code of the second device based on confirming, by the server, the first authentication code; and
   receiving, from the server, a completion message for a registration procedure for the second device.

7. The method of claim 6, wherein storing the first re-registration authentication code of the second device, comprising:
receiving, from the server, a first re-authentication code of the second device in response to the transmission of the first authentication code, wherein the first re-authentication code of the second device is generated by the server, when the first authentication code of the second device is confirmed;
storing the first re-registration authentication code of the second device in response to the reception of the first re-authentication code of the second device; and
transmitting, to the second device, the first re-registration authentication code of the second device in order for the second device to store the first re-authentication code of the second device.

8. The method of claim 6, wherein storing the first re-registration authentication code of the second device comprises:
receiving, from the server, a re-authentication code request message for the first re-authentication code, wherein the re-authentication code request message is transmitted, from the server when the first authentication code of the second device is confirmed by the server;
generating the first re-registration authentication code based on the first authentication code of the second device;
transmitting, to the server, the first re-registration authentication code; and
transmitting, to the second device, the first re-registration authentication code.

9. The method of claim 6, further comprising:
receiving, from to the server, the request message for a second re-authentication code; and
transmitting, to the server, a response message comprising the second re-authentication code in response to the request message for the re-authentication code, wherein the server performs a re-registration procedure of the second device by comparing the first re-registration authentication code and the second re-registration authentication code.

10. The method of claim 6, further comprising:
during performing the registration procedure of the second device, performing a registration procedure of at least one different device, that is located in an identical space where the device is located among spaces into which a service coverage where the home networking is supported is divided, or at least one different device that is grouped together with the second device for each use defined by a user.

11. A server for registering a device supporting home networking, the server comprising:
a transceiver coupled to a controller; and
the controller configured to:
receive, from a first device, a registration request message for a second device, wherein the registration request message includes device information of the second device;
identify that the second device is not registered based on the device information of the second device,
perform a registration procedure of the second device based on confirming a first authentication code of the second device,
obtain a first re-registration authentication code of the second device when the first authentication code of the second device is confirmed, the first re-registration authentication code to the device information of the second device, and
transmit, to the first device, a completion message for the registration procedure for the second device.

12. The server of as claimed in claim 11,
wherein the controller is further configured to:
transmit, to the first device, an authentication code request message for the second device,
receive, from the first device, an authentication code response message comprising the first authentication code of the second device in response to the authentication code request message,
generate the first re-registration authentication code based on the first authentication code of the second device when the first authentication code of the second device is confirmed, and
wherein the completion message comprises the first re-registration authentication code,
wherein the first re-registration authentication code is transmitted to the second device through the first device.

13. The server of claim 11,
wherein the controller is further configured to:
obtain the first re-registration authentication code generated by the first device from the response message when the first authentication code of the second device is confirmed.

14. The server of claim 11,
wherein the controller is further configured to:
identify that the second device is registered based on the device information of the second device,
transmit, to the first device, a request message for a second re-registration authentication code of the second device,
receive, from the first device, a response message comprising the second re-registration authentication code,
perform a re-registration procedure of the second device by comparing the first re-registration authentication code and the second re-registration authentication code,
if the first re-registration authentication code is same as the second re-registration authentication code, transmit, to the first device, a completion message for the re-registration procedure.

15. The server of claim 11, wherein, during performing the registration procedure of the second device, the controller is configured to perform a registration procedure of at least one different device, that is located in an identical space where the device is located among spaces into which a service coverage where the home networking is supported is divided, or at least one different device that is grouped together with the second device for each use defined by a user.

16. A first device for registering a device supporting home networking, the first device comprising:
a transceiver coupled to a controller; and
the controller configured to:
transmit, to a sever, registration request message for a second device;
receive, from the server, a request message for a first authentication code of the second device in response to the registration request message,
transmit, to the server, the first authentication code, wherein the server performs a registration procedure based on confirming the first authentication code,
store a first re-registration authentication code of the second device based on confirming, by the server, the first authentication code, and receive, from the server, a completion message for a registration procedure for the second device.

17. The first device of claim 16,
wherein the controller is further configured to:
receive, from the server, a first re-authentication code of the second device in response to the transmission of the first authentication code, wherein the first re-authentication code of the second device is generated by the server, when the first authentication code of the second device is confirmed,
store the first re-registration authentication code of the second device in response to the reception of the first re-authentication code of the second device, and
transmit, to the second device, the first re-registration authentication code of the second device in order for the second device to store the first re-authentication code of the second device.

18. The first device of claim 16,
wherein the controller is further configured to:
receive, from the server, a re-authentication code request message for the first re-authentication code of the second device, wherein the re-authentication code request message is transmitted, from the server, when the first authentication code of the second device is confirmed by the server,
generate the first re-registration authentication code based on the first authentication code of the second device,
transmit, to the server, the first re-registration authentication code, and
transmit, to the second device, the first re-registration authentication code.

19. The first device of claim 16,
wherein the controller is further configured to:
receive, from the server, the request message for a second re-authentication code, and
transmit, to the server, a response message comprising the second re-authentication code in response to the request message for the re-authentication code,
wherein the server performs a re-registration procedure of the second device by comparing the first re-registration authentication code and the second re-registration authentication code.

20. The first device of claim 16, wherein during performing the registration procedure of the second device, the controller is configured to perform a registration procedure of at least one different device, that is located in an identical space where the device is located among spaces into which a service coverage where the home networking is performed is divided, or at least one different device that is grouped together with the device for each use defined by the user.

* * * * *